(12) United States Patent
Kaukl et al.

(10) Patent No.: US 9,998,564 B1
(45) Date of Patent: Jun. 12, 2018

(54) USING CUSTOM PROTOCOL HEADERS TO MODIFY NON-HEADER DATA

(71) Applicant: Amazon Technologies, Inc., Reno, NV (US)

(72) Inventors: Christopher Vincent Kaukl, Sammamish, WA (US); Sunbir Gill, Irvine, CA (US); Walter Terry Heatlie, Corona, CA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 13/670,835

(22) Filed: Nov. 7, 2012

(51) Int. Cl.
*G06F 15/16* (2006.01)
*H04L 29/06* (2006.01)

(52) U.S. Cl.
CPC ................... *H04L 67/42* (2013.01)

(58) Field of Classification Search
CPC ............... H04L 67/42; H04L 12/5835; H04L 29/06027; H04L 63/10
USPC ......................... 709/203, 224, 226
See application file for complete search history.

(56) References Cited

U.S. PATENT DOCUMENTS

| 8,738,733 | B1 * | 5/2014 | Walters et al. | 709/218 |
| 2006/0074894 | A1 * | 4/2006 | Remahl et al. | 707/4 |
| 2008/0019390 | A1 * | 1/2008 | Singh et al. | 370/465 |
| 2010/0017500 | A1 * | 1/2010 | Lee | 709/219 |
| 2011/0145590 | A1 * | 6/2011 | Harada et al. | 713/185 |

\* cited by examiner

*Primary Examiner* — Hitesh Patel
(74) *Attorney, Agent, or Firm* — Thomas | Horstemeyer, LLP (57) ABSTRACT

An exemplary embodiment for translating requests from a client application includes a network server that is directed to receive a request from the client application and provide a customized response to the client application. The client application includes additional headers in the request which are not standard for an application protocol used in transmitting the request in order to transmit additional relevant information to the network server to get the customized response.

24 Claims, 6 Drawing Sheets

USING CUSTOM PROTOCOL HEADERS TO MODIFY NON-HEADER DATA

BACKGROUND

Service providers and merchants often find a need to obtain additional information from clients who make use of the online presence of the service provider or merchant. However, such information may not be inferable from information known to the service provider. While such information may be available to send from a user device, current methods for transmitting such information are often inadequate or non-existent.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the addition of custom headers to requests sent to a remote server. The custom headers are used to convey additional data that cannot be included in the body of the request. All requests to the server are first intercepted by a network service interceptor application. The network service interceptor then analyzes each request for the existence of custom headers and takes an appropriate action based upon one or more predetermined rules. Such actions may include directly forwarding the request, rejecting the request and returning an error message, or creating a new request that incorporates within the body data included in the custom headers of the original request. In various embodiments of the present disclosure, the data included within the custom headers directs the remote server to return a different response than the remote server otherwise would. For example, data included within the custom headers may direct the remote server to include additional debugging information within its response or may direct the remote server to provide a customized response based on the language, location, or market preferences of a user.

In the following discussion, a general description of the system and its components is provided, followed by a discussion of the operation of the same.

Figure 1:
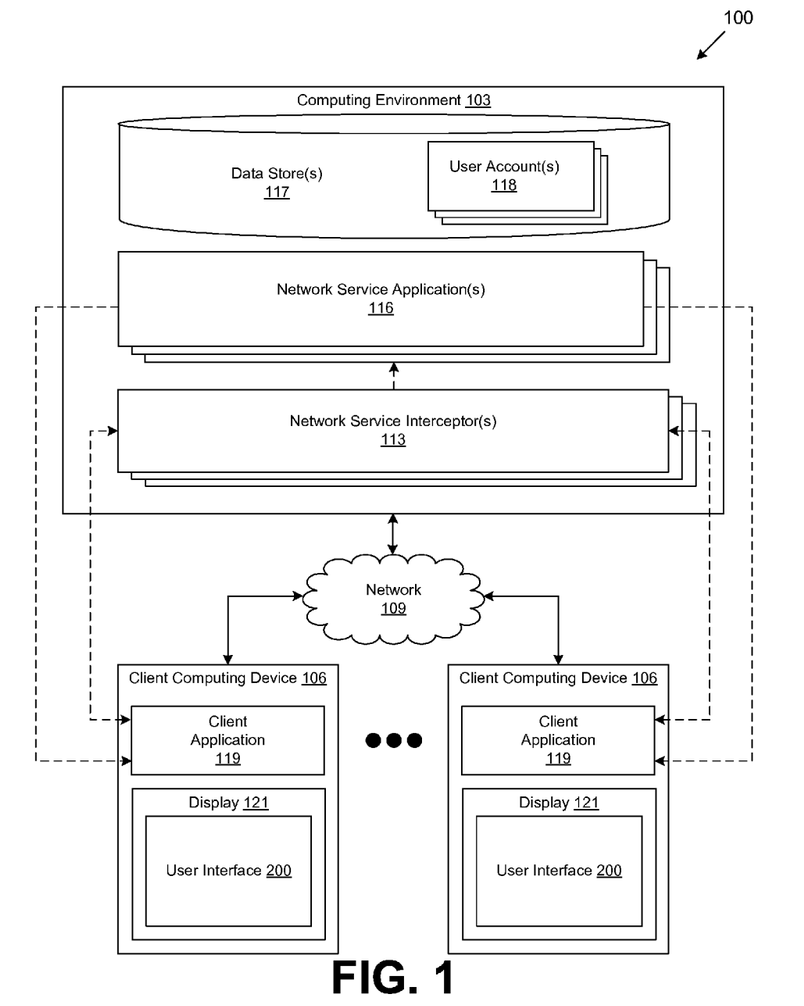
FIG. 1 is a drawing of a networked environment according to various embodiments of the present disclosure.

With reference to FIG. 1, shown is a networked environment 100 according to various embodiments. The networked environment 100 includes a computing environment 103 and a client computing device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed and that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. The components executed on the computing environment 103, for example, include the network service interceptor 113, the network service application 116, and other applications, services, processes, systems, engines, or functionality not discussed in detail herein. The network service interceptor 113 is executed to listen for requests directed to the network service application 116 and modify such requests as needed. The network service application 116 is executed to listen for requests for network content and respond with network resources. It is understood that one or more instances of the network service interceptor 113 and the network service application 116 may execute within the computing environment 103.

Also, various data is stored in a data store 117 that is accessible to the computing environment 103. The data store 117 may be representative of a plurality of data stores 117 as can be appreciated. The data stored in the data store 117, for example, is associated with the operation of the various applications and/or functional entities. The data stored in the data store includes, for example, user accounts 118. Information associated with a user account includes, for example, information which can be used to authenticate a user of the client computing device 106 or authorize a user's access to the network service application 116.

The client computing device 106 is representative of a plurality of client devices that may be coupled to the network 109. The client computing device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 106 may include a display 121. The display 121 may comprise, for example, one or more devices such as liquid crystal displays (LCDs), gas plasma-based flat panel displays, organic light emitting diode (OLED) displays, LCD projectors, or other types of display devices, etc.

The client computing device 106 may be configured to execute various applications such as a client application 119 and/or other applications. The client application 119 may be executed in a client computing device 106, for example, to access network content served up by the computing environment 103 and/or other servers, thereby rendering a user interface 200 on the display 121. The client application 119 may comprise, for example, a browser, a mobile application, etc., and the user interface 200 may correspond to a network page, a mobile application screen, etc. The client computing device 106 may be configured to execute applications beyond the client application 119 such as, for example, email applications, social networking applications, and/or other applications.

Next, a general description of the operation of the various components of the networked environment 100 is provided. To begin, it is assumed that a user manipulates the user interface 200 of the client application 119 to request network content from the network service application 116. The request may comprise, for example, a request for a network page such as a web-page, a remote procedure call to a network service such as a web-service, or a request for other content or resources available over a network. The request may be communicated from the client computing device 106 to the network service application 116 using hypertext transfer protocol (HTTP), simple mail transfer protocol (SMTP), file transfer protocol (FTP), or another appropriate protocol as can be appreciated.

In addition to the headers and data which are standard for the application protocol of the request, the client application 119 may also include in the request additional headers which are not standard to the application protocol of the request. The purpose of the additional non-standard or custom headers is to transmit additional data to the network service application while complying with the requirements of the application protocol. In one particular embodiment of the present disclosure, a request to a web-service using HTTP may include additional headers which are not part of the HTTP standard. Unknown to the client application 119, the request is routed to the network service interceptor 113 instead of the network service application 116.

The network service interceptor 113, upon receiving a request, analyzes the request for the existence of additional, custom headers. If custom headers are found, the network service interceptor 113 validates the custom headers by checking for compliance with a predetermined set of rules. Such rules may include rules relating to the length, format, or contents of the custom header, or other rules which may be appropriate. If the custom headers or the contents thereof are invalid, then the initial request may be rejected, dropped, or another appropriate action may be taken. In the alternative, if the custom headers or the contents thereof are valid, the network service interceptor 113 creates a second request. The second request includes the same non-header data as the initial request and the same headers as the initial request that are standard to the application protocol. However, data included in the initial request's custom headers are instead included as data in the body of the second request. The second request is then sent to the network service application 116 and network service interceptor 113 drops the initial request from the client application 119. Upon receiving the second request, the network service application 116 subsequently responds to the client application 119.

In one particular embodiment of the present disclosure, the network service interceptor 113 may be used to change the contents of the response provided by the network service application 116. For example, American users of an electronic commerce system generally want responses to cause the client application 119 to generate a user interface 200 in English, while German users of the same electronic commerce system generally want responses to cause the client application 119 to generate a user interface 200 in German. While an electronic commerce system may be able to use an IP address based geo-location to determine that a request originated in either the United States or Germany, this does not mean that the user of the client application 119 that originated the request comprehends English or German. The user could very well be an American travelling in Germany or a German traveling in the United States.

Therefore, particular embodiments of the present disclosure may include custom headers regarding user preferences such as language within a custom header of a request to the network service application 116. The network service interceptor 113, upon finding the custom header within the request, will create a second request to the network service application 116 that directs the network service application 116 to return a response to the client application 119 in an appropriate language. The network service interceptor 113 will then forward the second request to the network service application 116 and drop the first request. The network service application 116 will subsequently provide a response to the client application 119 executing on the client computing device 106 in the language indicated.

In another embodiment of the present disclosure, the network service interceptor 113 may be used to screen requests sent to the network service application 116. In this particular embodiment, the network service interceptor 113 checks the validity of each request from the client application 119 to the network service application 116. In the event that a request is found to be invalid according to a predetermined rule. For example if a custom or non-standard header is invalidly formed or otherwise constructed, then the network service interceptor 113 may respond directly to the client application 119 with an error message. In several embodiments of the present disclosure, the response may include debugging information which identifies the cause of the error and possible solutions. The client application 119 can then generate a user interface 200 which contains this information and is subsequently rendered on the display 121.

Sitting between the client application 119 and the network service application 116 provides additional benefits. First, the network service interceptor 113 is able to protect the network service application 116 from potentially receiving malformed requests that could pose a security risk. Second, the network service interceptor 113 is able to conserve the computing resources consumed by the network service application 116 because the network service interceptor 113 limits the requests received by the network service application 116 to those which are properly formed and contain valid data. The network service application 116 does not have to expend resources handling these invalid requests. Additional benefits may also be derived from placing the network service interceptor 113 in between the client application 119 and the network service application 116.

In a further embodiment of the present disclosure, the network service interceptor 113 may be used to direct the network service application 116 to omit from or include certain items in the response. For example, different countries have different laws regulating what may or may not be sold through an electronic commerce system. IP address based geo-location may be used to determine the location from which a request originated in order to provide a response that complies with local laws. However, IP address based geo-location does not always accurately determine the location from which a request originated. This is particularly the case when a request originates from the border region of two countries. For example, requests originating in close proximity to the American-Canadian border may show an American IP address even though the request originated within Canada, or vice-versa. This is an especially common problem with mobile devices such as cell-phones, PDA's and tablet computers accessing the Internet over a cellular network. For example, a client computing device 106 may be located within Canada, but accessing the Internet through a cellular tower located across the border in the United States.

Therefore, according to various embodiments, fine-grained data regarding a user's geographic location or nationality may be included within a custom header of a request to the network service application 116. The network service interceptor 113, upon finding the custom header within the request, will create a second request to the network service application 116 that directs the network service application 116 to omit or include specific items in the response in order to comply with local laws associated with the location from which the request originated. It is understood that the second request may be generated either by modifying the first request directly, or by creating a separate second request and dropping the first request.

In an additional embodiment of the present disclosure, the network service interceptor 113 may provide backwards compatibility between a client application 119 and a network service application programming interface (API) provided by the network service application 116. For example, new versions of a client application 119 may be released and installed on a plurality of client computing devices 106. The new versions of the client application 119 may provide additional features or functionality to users of the client computing device 106. However, older versions of the client application 119 may still be installed on a plurality of client computing devices 106 and used by associated users.

Requests to the network service API may be made using a number of application protocols, including hypertext transport protocol (HTTP), file transfer protocol (FTP), simple network message protocol (SNMP), simple mail transport protocol (SMTP), or any number of other application protocols. It is understood that the underlying applications protocols provide separate header and body components which may be used by various applications.

Therefore, according to various embodiments, the client application 119 may include additional data within a custom header of a request to the network service application 116 in order to make use of additional functionality provided by the network service API. The network service interceptor 113, upon finding the custom header within the request, will create a second request to the network service application 116 that directs the network service application 116 to provide additional features or functionality to the client application 119 in the response. It is understood that the network service interceptor 113 may either create a separate second request, or modify the first request directly in order to incorporate content of the custom headers of the first request into the body of the second request. This permits a single version of the API provided by the network service application 119 to communicate with multiple versions of the client application 119 and provide varying degrees of functionality and features to the client applications 119 depending on the version of the client application 119.

Figure 2A:
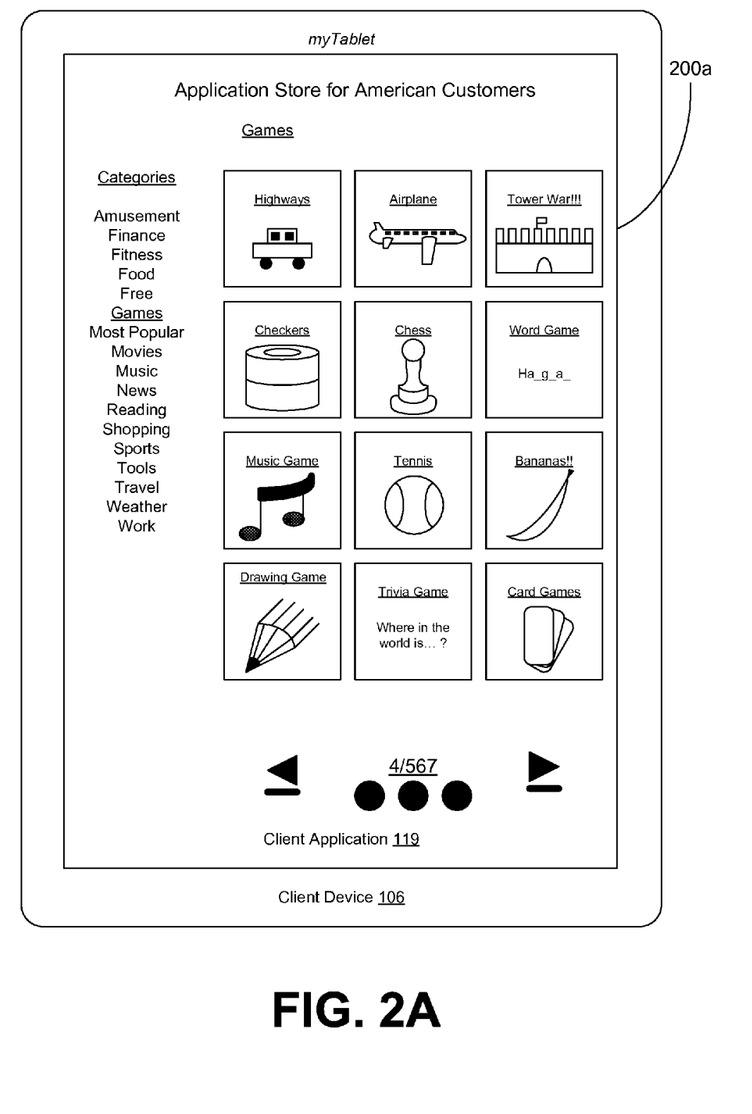
FIGS. 2A-2C are drawings of examples of user interfaces rendered by a client in the networked environment of FIG. 1 according to various embodiments of the present disclosure.

Referring next to FIG. 2A, shown is one example of user interface 200, denoted herein as user interface 200a, according to various embodiments. The user interface 200a is generated by a client application 119 and rendered on the display 121 (FIG. 1) of the client computing device 106 after receiving a response from the network service application 116. It is assumed that the client application 119 has included at least one custom header in the request to the network service application 116 indicating that the user of the client application 119 is of a specific nationality such as American or that the request from the client application 119 originated from a specific locale such as the United States. It is further understood that the network service interceptor 113 has received the request, and created a new request to send to the network service application 116 which includes the information within the custom header.

Figure 2B:
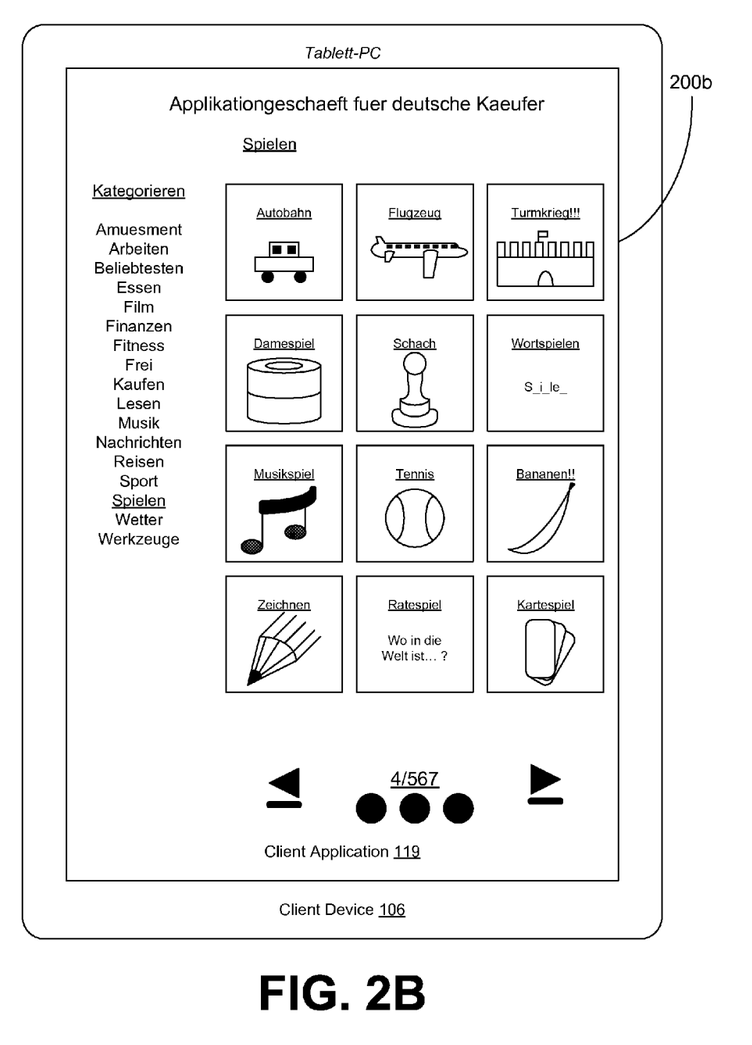

Turning now to FIG. 2B, which shows another example of user interface 200, denoted herein as user interface 200b, according to various embodiments. The user interface 200b is generated by a client application 119 and rendered on the display 121 (FIG. 1) of the client computing device 106 after receiving a response from the network service application 116. It is assumed that the client application 119 has included at least one custom header in the request to the network service application 116 indicating that the user of the client application 119 is a German or other nationality, or that the request from the client application 119 originated within Germany or other nation. It is further understood that the network service interceptor 113 has received the request, and created a new request to send to the network service application 116.

With respect to FIGS. 2A and 2B, it is understood that the content included within the response may differ in addition to the language of the response. Many countries have differing laws regarding what is legal or illegal to purchase or sell within the jurisdiction of a country. Certain items which may be legal to purchase or sell in one country may be illegal to purchase or sell in a bordering country. As previously described, an IP address based geo-location may not be able to pinpoint the origin of a request with necessary accuracy. By having the client application 119 include data regarding the location of the client computing device 106, the network service application 116 can include or exclude items from the response as appropriate.

With respect to FIGS. 2A and 2B, it is also understood that the content included within the response may differ for market reasons. Certain types and brands of items are more popular with consumers in some markets than others. Consumers who travel to other markets may still wish to have the ability to easily find and purchase products they prefer even though the consumer is currently in a different market. Therefore, including market related data within the custom header, such as the domicile or nationality of a consumer, allows the consumer to continue to have access to the goods and services they prefer.

Figure 2C:
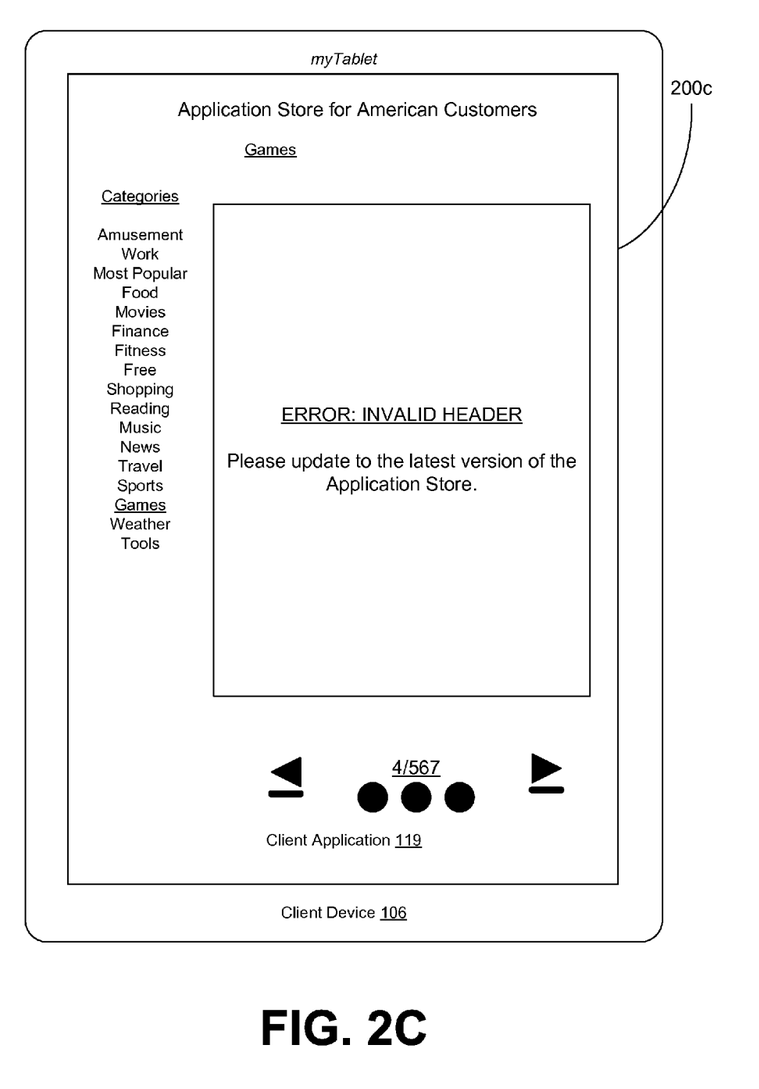

Moving on to FIG. 2C, shown is a further example of user interface 200, denoted herein as user interface 200c, according to various embodiments. In this particular embodiment, user interface 200c is generated by a client application 119 and rendered on the display 121 (FIG. 1) of the client computing device 106 after receiving a response from the network service application 116. It is assumed that the client application 119 has included at least one custom header in the request to the network service application 116, but that the custom header was invalid in some aspect. It is further understood that the network service interceptor 113 has received the request, and responded with an error message upon determining that at least one custom header was invalid in some manner. By screening for requests with invalid customer headers providing error messages in response, such as the one embodied in user interface 200c, the network service interceptor 113 is able to direct users to update the client application 119 as needed.

Figure 3:
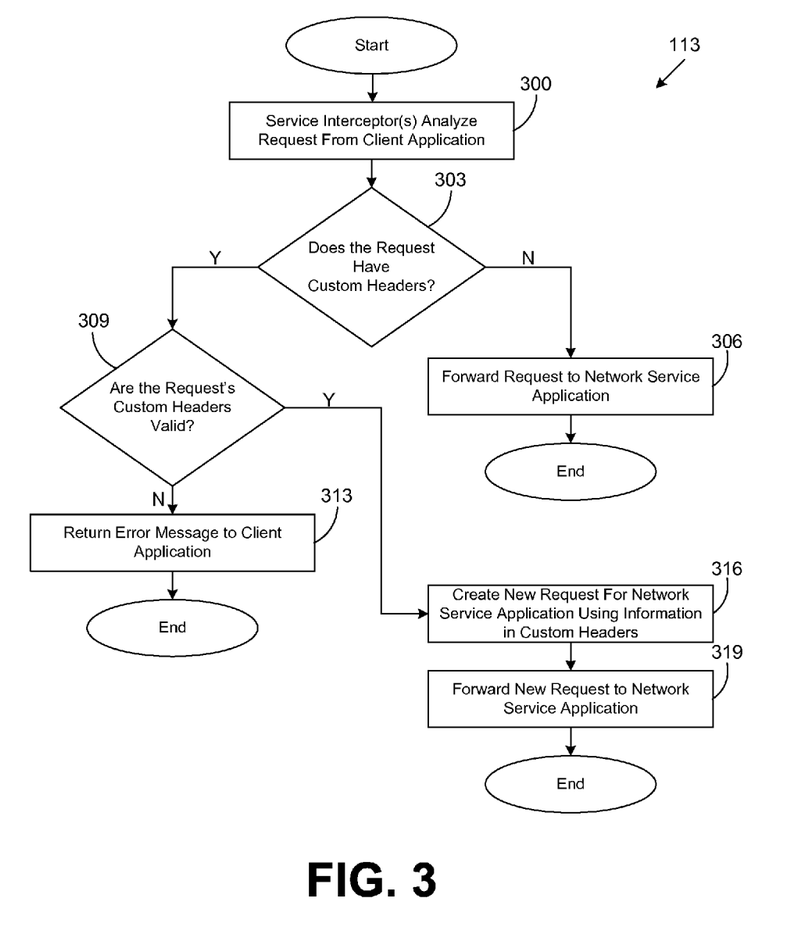
FIG. 3 is a flowchart illustrating one example of functionality implemented as portions of a network service interceptor executed in a computing environment in the networked environment of FIG. 1 according to various embodiments of the present disclosure.

Referring next to FIG. 3, shown is a flowchart that provides one example of the operation of a portion of the network service interceptor 113 according to various embodiments. It is understood that the flowchart of FIG. 3 provides merely an example of the many different types of functional arrangements that may be employed to implement the operation of the portion of the network service interceptor 113 as described herein. As an alternative, the flowchart of FIG. 3 may be viewed as depicting an example of steps of a method implemented in the computing environment 103 (FIG. 1) according to one or more embodiments.

FIG. 3 embodies the interactions between a client application 119 (FIG. 1) executing on a client computing device 106, the network service interceptor 113, and the network service application 116 (FIG. 1). It is assumed that the client application 119 has already sent a request addressed to the network service application 116, but that the request was redirected to the network service interceptor 113 instead.

Beginning with box 300, the network service interceptor analyzes the request from the client application. In one particular embodiment of the present disclosure, analysis is accomplished by parsing the request and examining the individual parts of the request.

Proceeding to box 303, the network service interceptor determines if the request contains headers which are not standard to the application protocol. If no such headers are included in the request, then execution proceeds to box 306. Otherwise, execution proceeds to box 309.

If execution proceeds to box 306, the request is forwarded directly to the network service application 116. The request is not modified because the request does not include non-standard headers. Therefore, generating a new request would merely create an identical copy of the original request. Instead, efficiency gains can be realized by directly forwarding the initial request from the client application 119 to the network service application 116. Subsequent to forwarding the request to the network service application 116, execution ends until a new request is received by the network service interceptor 113.

However, if execution proceeds to box 309, then the network service interceptor 113 inspects the non-standard headers of the request for validity. The validity is determined by comparing each non-standard header included in the request against a set of predetermined rules. Common rules which may be used in several embodiments of the present disclosure include rules governing the size, content, format, or other aspects associated with the structure of the non-standard header. In the event that a non-standard header fails to comply with at least one of the predefined rules, then execution proceeds to box 313. If every non-standard header included in the request complies with each of the predetermined rules, then execution proceeds to box 316.

If execution proceeds to box 313, then the network service interceptor 113 constructs an error message. In various embodiments of the present disclosure, the error message may contain detailed information regarding the nature of the error in order to aid with debugging of the network service interceptor 113. In other embodiments, the error message may be nondescript and provide little, if any, details regarding the cause of the error message as a security measure. After creating the error message, the network service interceptor 113 sends the error message to the client application 119 in response to the request. Execution subsequently ends until a new request is received by the network service interceptor 113.

However, if execution proceeds to box 316, the network service interceptor 113 creates a new request which includes the same headers that are standard for the application protocol and the same information contained in the body of the initial request from the client application 119. Further, any information included as a non-standard header in the original request is included as data in the body of the new request. Such information may include data associated with a user account 118 (FIG. 1) stored in data store 117 (FIG. 1), such as a user's language preferences, authenticating information. Such information may also include indicators or flags directing the network service application 116 to provide additional debugging information in its response to the client application 119. Other data may also be included in the information as appropriate for a given situation. After the request is created, execution continues to box 319.

Proceeding to box 319, the network service interceptor 113 forwards the generated request to the network service application 116 and directs the network service application 116 to respond directly to the client application 119. The network service interceptor then drops the original request received from the client application 119. Execution subsequently ends until a new request is received by the network service interceptor 113.

Figure 4:
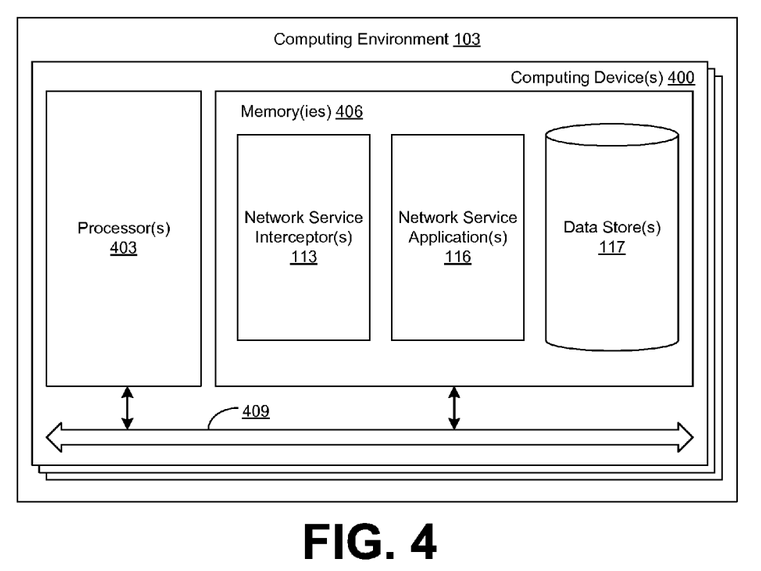
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are network service interceptor 113, the network service application 116, and potentially other applications. Also stored in the memory 406 may be a data store 117 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although network service interceptor 113, network service application 116, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the network service interceptor 113. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network service interceptor 113, the network service application 116, and the client application 119, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Figure 5:
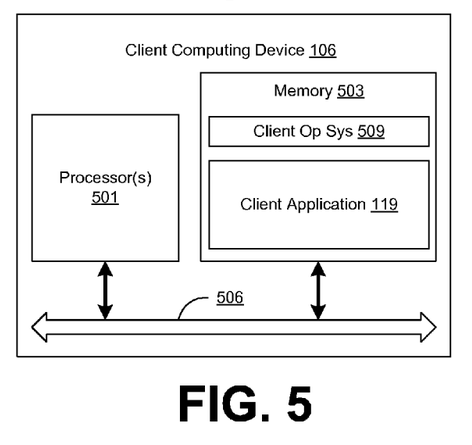
FIG. 5 is a schematic block diagram that provides one example illustration of a client computing device employed in the networked environment of FIG. 1 according to various embodiments of the present disclosure.

With reference to FIG. 5, shown is a schematic block diagram of the client computing device 106 according to an embodiment of the present disclosure. Each client computing device 106 includes at least one processor circuit, for example, having a processor 501 and a memory 503, both of which are coupled to a local interface 506. To this end, each client computing device 106 may comprise, for example, at least one server computer or like device. The local interface 506 may comprise, for example, a data bus with an accompanying address/control bus or other bus structure as can be appreciated.

Stored in the memory 503 are both data and several components that are executable by the processor 501. In particular, stored in the memory 503 and executable by the processor 501 are the client application 119, and potentially other applications. In addition, a client operating system 509 may be stored in the memory 503 and executable by the processor 501.

It is understood that there may be other applications that are stored in the memory 503 and are executable by the processor 501 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 503 and are executable by the processor 501. In this respect, the term "executable" means a program file that is in a form that can ultimately be run by the processor 501. Examples of executable programs may be, for example, a compiled program that can be translated into machine code in a format that can be loaded into a random access portion of the memory 503 and run by the processor 501, source code that may be expressed in proper format such as object code that is capable of being loaded into a random access portion of the memory 503 and executed by the processor 501, or source code that may be interpreted by another executable program to generate instructions in a random access portion of the memory 503 to be executed by the processor 501, etc. An executable program may be stored in any portion or component of the memory 503 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 503 is defined herein as including both volatile and nonvolatile memory and data storage components. Volatile components are those that do not retain data values upon loss of power. Nonvolatile components are those that retain data upon a loss of power. Thus, the memory 503 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 501 may represent multiple processors 501 and/or multiple processor cores and the memory 503 may represent multiple memories 503 that operate in parallel processing circuits, respectively. In such a case, the local interface 506 may be an appropriate network that facilitates communication between any two of the multiple processors 501, between any processor 501 and any of the memories 503, or between any two of the memories 503, etc. The local interface 506 may comprise additional systems designed to coordinate this communication, including, for example, performing load balancing. The processor 501 may be of electrical or of some other available construction.

Although the client application 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program, when executed, causes the at least one computing device to at least:

listen for a first request from a client application executing on at least one client device to a network service application executing on the at least one computing device;

parse the first request for a custom header that is non-standard with respect to an application protocol of the first request;

determine that the custom header complies with a rule specifying a format of the custom header;

compare the custom header to an account of a user to authenticate the client application;

compare the custom header to information associated with the account of the user to authorize access to the network service application by the client application;

create a second request on behalf of the client application in response to detection of the custom header, wherein the second request includes non-header data based at least in part upon the custom header of the first request, in addition to identical non-header data as included in the first request;

send the second request to the network service application; and discard the first request.

2. A system, comprising:

a computing device comprising a processor and a memory; and an application executable in the computing device, the application comprising a set of instructions stored in the memory that, when executed by the processor, cause the computing device to at least:

listen for a first request from a client application to a network service application, the first request including a first body portion and a first header portion;

examine the first header portion of the first request for a custom header that is non-standard with respect to an application protocol of the first request;

generate a second request on behalf of the client application, to include a second body portion that combines the custom header of the first request and the first body portion of the first request, wherein the second request is configured for use by the network service application; and send the second request to the network service application.

3. The system of claim 2, wherein the application further comprises instructions that cause the computing device to at least prevent the first request from the client application from directly reaching the network service application.

4. The system of claim 2, wherein the application further comprises instructions that cause the computing device to at least drop the first request after sending the second request to the network service application.

5. The system of claim 2, wherein the first request causes the network service application to provide a first response to the client application and the second request causes the network service application to provide a second response to the client application, wherein the second response omits content as compared to the first response.

6. The system of claim 2, wherein the second request is created when the first request contains the custom header.

7. The system of claim 2, wherein the first request makes use of an application programming interface provided by the network service application.

8. The system of claim 5, wherein the first response results from functionality provided by an application programming interface of the network service application and the second response results from additional functionality provided by the application programming interface of the network service application beyond that of the first response.

9. The system of claim 5, wherein the second response comprises debugging information.

10. The system of claim 5, wherein the second response is customized to a locale associated with an account associated with the client application.

11. The system of claim 6, wherein the application further comprises instructions that cause the computing device to at least forward the first request directly to the network service application without a modification in lieu of creating the second request.

12. The system of claim 10, wherein the second response is in a language associated with the locale.

13. The system of claim 2, wherein the first request causes the network service application to provide a first response to the client application and the second request causes the network service application to provide a second response to the client application, wherein the second response includes additional predetermined content as compared to the first response.

14. A computer-implemented method, comprising:

listening, via a first computing device, for a first request sent through a network from a client application executing on a client computing device to a network service application executing on a second computing device;

parsing, via the first computing device, the first request from the client application to the network service application to search for a custom header that is non-standard with respect to an application protocol associated with the first request;

creating, via the first computing device, a second request on behalf of the client application that includes a body portion that is based at least in part upon the custom header; and sending the second request to the network service application.

15. The computer-implemented method of claim 14, wherein the first request comprises a request to an application programming interface provided by the network service application.

16. The computer-implemented method of claim 14, further comprising dropping, via the first computing device, the first request after sending the second request to the network service application.

17. The computer-implemented method of claim 14, wherein the second request includes identical non-header data as the first request.

18. The computer-implemented method of claim 14, further comprising comparing, via the first computing device, the custom header to a predetermined rule specifying a format of the custom header.

19. The computer-implemented method of claim 18, further comprising:

returning, via the first computing device, an error message to the client application in response to the first request if the custom header fails to match the format specified by the predetermined rule;

refusing, via the first computing device, to create the second request;

refusing, via the first computing device, to forward the first request to the network service application executing on the second computing device; and dropping, via the first computing device, the first request.

20. The computer-implemented method of claim 14, further comprising comparing, via the first computing device, the custom header to the first request to verify an integrity of the first request.

21. The computer-implemented method of claim 14, further comprising comparing, via the first computing device, the custom header to information associated with an account of a user for the purpose of authentication of the user of the client application.

22. The computer-implemented method of claim 14, further comprising comparing, via the first computing device, the custom header to information associated with an account corresponding to the client application for the purpose of authorizing the client application to access the network service application.

23. The system of claim 2, wherein the second request includes a second header portion that omits the custom header but is otherwise identical to the first header portion of the first request.

24. The computer-implemented method of claim 14, wherein the first request comprises a request to an application programming interface provided by the network service application, and the second request is further configured for use by the network service application executing on the second computing device.

\* \* \* \* \*